(12) United States Patent
Vainberg et al.

(10) Patent No.: US 6,524,842 B1
(45) Date of Patent: Feb. 25, 2003

(54) BIODEGRADATION OF GASOLINE OXYGENATES

(75) Inventors: Simon Vainberg, Robbinsville, NJ (US); Robert J. Steffan, Wrightstown, PA (US)

(73) Assignee: Envirogen, Inc., Lawrenceville, NJ (US)

(*) Notice: Subject to any disclaimer, the term of this patent is extended or adjusted under 35 U.S.C. 154(b) by 0 days.

(21) Appl. No.: 09/608,368

(22) Filed: Jun. 30, 2000

(51) Int. Cl.$^7$ .......................... B09B 3/00; C12N 13/00; C12N 1/32

(52) U.S. Cl. .................. 435/262.5; 435/42; 435/173.8; 435/247; 435/248; 435/821; 435/863

(58) Field of Search .......................... 435/262.5, 863, 435/42, 821, 173.8, 247, 248; 210/601, 610, 611, 612, 613, 620, 621

(56) References Cited

U.S. PATENT DOCUMENTS

| | | | |
|---|---|---|---|
| 4,855,051 A | 8/1989 | Insell | 210/601 |
| 5,221,159 A | 6/1993 | Billings | 405/128 |
| 5,277,518 A | 1/1994 | Billings | 405/128 |
| 5,399,495 A | 3/1995 | Patt et al. | 435/262.5 |
| 5,427,944 A | 6/1995 | Lee et al. | 435/262.5 |
| 5,472,294 A | 12/1995 | Billings | 405/128 |
| 5,474,934 A * | 12/1995 | Adamus et al. | 435/262.5 |
| 5,750,364 A * | 5/1998 | Salanitro | 435/42 |
| 5,814,514 A * | 9/1998 | Steffan et al. | 435/262 |
| 5,902,734 A * | 5/1999 | Salanitro | 435/42 |
| 6,194,197 B1 * | 2/2001 | Hyman et al. | 435/254.1 |

OTHER PUBLICATIONS

Steffan, Robert J. et al. "Biotreatment of mtbe with a new bacterial isolate". Biochem. Phytorem. Chlorinated Recalcitrant Comp Int. Conf. 2000, pp. 165–173.*
Park, K. and R. Cowan, "Effects of oxygen and temperature on the biodegradation of MTBE", American Chemical Society National Meeting, 37:421–423 (Apr., 1997).
Park and Cowan, "Effects of oxygen and temperature on the biodegradation of MTBE", Abstract 241 (1997).
American Petroleum Institute, Chemical Fate and Impact of Oxygenates in Groundwater: Solubility of BTEX from Gasoline–Oxygenate Mixtures, Pub. No. 4531, 1991.
Anderson, "Health Studies Indicate MTBE is Safe Gasoline Additive," *Chemical and Engineering News*, 9–18, Sep. 20, 1993.
Bradley, P. M. J., J. E. Landmeyer, and F. H. Chapelle. "Aerobic mineralization of MTBE and tert–butyl alcohol by stream–bed sediment microorganisms", *Environ. Sci. Technol.*, 33:1877–1879 (1999).
Buscheck, T.E., D.J. Gallagher, T.R. Peargin, D.L. Kuehne, and C.R. Zuspan Occurence and behavior of MTBE in groundwater. *Proc. Nat. Groundwater Assoc. SW Focused Groundwater Conf*, pp. 2–3. Anaheim, CA. (Jun. 3–4 1998).

Cowan, R and K. Park, "Biodegradation of gasoline oxygenates MTBE, ETBE, TAME, TBA, and TAA by aerobic mixed cultures", *Proc. 28$^{th}$ Mid–Atlantic Industrial and Hazardous Waste Conference* (1996).
Fortin, N.Y. and M.A. Deshusses, "Treatment of methyl tert–butyl ether vapors in biotrickling filters. 2. Analysis of the rate–limiting step and behavior under transient conditions", *Environmental Science and Technology*, 33:2987–2991 (1999).
Hanson, J.R., C.E. Ackerman, and K.M. Skow, "Biodegradation of methyl tert–butyl ether by a bacterial pure culture," *Applied and Environmental Microbiology*, 65:4788–4792 (1999).
Hardison, L. K., S. S. Curry, L. M. Ciuffetti, and M. R. Hyman, "Metabolism of diethyl ether and cometabolism of methyl tert–butyl ether by a filamentous fungus, a Graphium sp.", *Applied and Environmental Microbiology* 63:3059–3067 (1997).
Hareland, W., R.L. Crawford, P.J. Chapman, and S. Dagley, metabolic function and properties of 4–hydroxyphenylacetic acid 1–hydrolase from *Pseudomonas acidovorans*, *Journal of Bacteriology*, 175:272–285 (1975).
Hazen, T.C. et al., 1994, Summary of in situ bioremediation demonstration (methane biostimulation) via horizontal wells as the Savannah River Site Integrated Demonstration Project, in: In Situ *Remediation: Scientific Basis for Current and Future Technologies*, Battelle Press, Richland, WA, pp. 137–150.
Lombard, K.H., J.W. Borthen and T.C. Hazen, 1994, The design and management of system components for in situ methanotrophic bioremediation of chlorinated hydrocarbons at the Savannah River Site, in: R.E. Hinchee (ed.), *Air Sparging for Site Remediation*, Lewis Publishers, Boca Raton, FL, pp. 81–96.
Marley, M.C., E.X. Droste, H.H. Hopkins, and C.J. Bruell, 1996, Use Air Sparging to Remediate, *Environ. Engineer. World*, Mar.–Apr. 1996, 6–14.
Marley, Michael C., "Removing Gasoline from Soil and Groundwater Through Air Sparging,", *Remediation*, pp. 121–131, Spring 1992.
Marley, M.C. and Edward X. Droste, "Successfully Applying Sparging Technologies,", *Remediation*, Summer 1995.

(List continued on next page.)

Primary Examiner—David A. Redding
(74) Attorney, Agent, or Firm—Synnestvedt & Lechner LLP

(57) ABSTRACT

A method for degrading an undesirable ether-based environmental contaminant by contacting the ether with a hydrogen-oxidizing microorganism to convert the ether to innocuous compounds which are environmentally acceptable, including treating the ether-based contaminants in situ or removing them from the contaminated site for treatment in a bioreactor, examples of the ether-based contaminants being tertiary butyl ethers of the type utilized as gasoline oxygenates, for example, methyl tert-butyl ether, ethyl tert-butyl ether, and methyl tert-amyl ether, and also ether solvents, for example, tetrahydrofuran.

36 Claims, 6 Drawing Sheets

OTHER PUBLICATIONS

Mo, K. C.O.Lora, A.E. Wanken, M. Javanmardian, X., Yang, and C.F. Kulpa, "Biodegradation of methyl tert–butyl ether by pure bacterial cultures", *Applied and Environmental Microbiology*, 47:69–72 (1997).

Mormile et al. "Anaerobic Biodegradation of Gasoline Oxygenates: Extrapolatio of Information to Multiple Sites and Redox Conditions," *Environ. Sci. Technol.*, 28:1727–1732, (1994).

Reisch, M.S., *Chemical & Engineering News*, Apr. 11, 1994; p. 12–15.

Robinson, M., R.H. Bruner, and G.R. Olson, "Fourteen and ninety day oral toxicity studies of methyl tertiary butyl ether in Sprague–Dawley rats," *J. Am. Coll. Toxicol.*, 9:525–540 (1990).

Salanitro, J.P., L.A. Diaz, M.P. Williams, and H.L. Wimiewski, "Isolation of a Bacterial Culture that Degrades Methyl t–Butyl Ether," *Applied and Environmental Microbiology*, vol. 60, No. 7, pp. 2593–2596, Jul. 1994.

Salinitro, J.P., C.–S. Chou, H.L. Wisniewski, and T. E. Vipond, "Perspectives on MTBE biodegradation and the potential for in situ aquifer bioremediation" *Proceedings of the National Groundwater Association South West Focused Groundwater Conference* pp. 40–54. Anaheim, CA. (Jun. 3–4, 1998).

Squillance, P. J., J. S. Zogorski, W. G. Wilber, and C. V. Price. "Preliminary assessment of the occurrence and possible sources of MTBE in groundwater in the United States, 1993–1994". *Environ. Sci. Technol.* 30:1721–1730 (1996).

Steffan, R.J. K. McClay, S. Vainberg, C.W. Condee, and D. Zhang. Biodegradation of the gasoline oxygenates methyl tert–butyl ether (MTBE), ethyl tert–butyl ether (ETBE), and tert–amyl methyl ether (TAME) by propane oxidizing bacteria, *Applied and Environmental Microbiology*, 63:4216–4222, (1997).

Van Schie, P.M. and L.Y. Young, "Isolation and characterization of phenol–degrading denitrifying bacteria". *Applied and Environmental Microbiology*, 64:2432–2438 (1998).

Welch, D.F. 1991. "Application of cellular fatty acid analysis", *Clinical Microbiology Review*, 4: 422–438 (1991).

Yeh, C.K. and J.T. Novak. "Anaerobic biodegradation of gasoline oxygenates in soil", *Water Environmental Research*, 66:744–752. (1994).

Belisle et al., "Isolation and expression of a gene cluster responsible for biosynthesis of the glycopeptidolipid antigens of *Mycobacterium avium,*" *J. Bacteriology*, vol. 173, No. 21, pp. 6991–6997 (1991).

Brockman et al., "Effect of gaseous nitrogen and phosphorus injection on in situ bioremediation of a trichloroethylene–contaminated site," *J. of Hazardous Materials*, 41, 287–298 (1995).

Burback and Perry, "Biodegradation and biotransformation of groundwater pollutant mixtures by *Mycobacterium vaccae,*" *Applied and Environmental Microbiology*, vol. 59, No. 4, pp. 1025–1029 (1993).

Christie et al., "Two conjugation systems associated with *Streptococcus faecalis* plasmid pCF10: identifiecation of a conjugative transposon that transfers between *S. faecalis* and *Bacillus subtilis,*" *J. Bacteriology*, vol. 169, No. 6, pp. 2529–2536 (1987).

DeLorenzo et al., "Mini–Tn5 transposon derivatives for insertion mutagenesis, promoter probing, and chromosomal insertion of cloned DNA in gram–negative eubacteria," *J. Bacteriology*, vol. 172, No. 11, pp. 6568–6572 (1990).

Dror and Freeman, "Stabilization of microbial cytochrome P–450 activity by creation of stationary–phase conditions in a continuously operated immobilized–cell reactor," *Applied and Environmental Microbiology*, vol. 61, No. 3, pp. 855–859 (1995).

Friedman et al., "Construction of a broad host range cosmid cloning vector and its use in the genetic analysis of Rhizobium mutants," *Gene*, 18, pp. 189–296 (1982).

Garnier et al., "Cometabolic biodegradation of methyl t–butyl ether by *Pseudomonas aeruginosa* grown on pentane," *Appl. Microbiol. Biotechnol.*, 51, 498–503 (1999).

Herrero et al., "Transposon vectors containing non–antibiotic resistance selection markers for cloning and stable chromosomal insertion of foreign genes in gram–negative bacteria," *J. Bacteriology*, vol. 172, No. 11, pp. 6557–6567 (1990).

Jacobs et al., "Genetic systems for mycobacteria," *Methods in Enzymology*, vol. 204, 537–555 (1991).

Marley et al., "The application of in situ air sparging as an innovative soils and ground water remediation technology," *Ground Water Monitoring Review* (reprint), (1992).

Martin, C. et al., "Transposition of an Anitbiotic Resistance Element in Mycobacteria," *Nature*, vol. 345, pp. 739–743 (1990).

McClay et al., "Cloroform mineralization by toluene–oxidizing bacteria," *Applied Environmental Microbiology*, vol. 62, No. 8, pp. 2716–2722 (1996).

Miles, John S., "Structurally and functionally conserved regions of cytochrome P–450 reductase as targets for DNA amplification by the polymerase chain reaction," *Biochem. J.*, 287, pp. 195–200 (1992).

Mo, K. et al., "Biodegradation of petroleum and petroleum by–products," American Society for Microbiology, 95th General Meeting Abstracts, Session 71 (1995).

Olsen et al., "Development of broad–host–range vectors and gene banks: self–cloning of the *Pseudomonas aeruginosa* PAO chromosome," *J. Bacteriology*, vol. 150, No. 1, pp. 60–69 (1982).

Raag, R. and Poulos, T.L. "Crystal structure of the carbon monoxide–substrate chtochrome P450$_{CAM}$ ternary complex," *Biochemistry*, vol. 28, No. 19, pp. 7586–7592 (1989).

Rainey, James, "Chemical that cuts smog may threaten water," *Los Angeles Times*, Metro, Part B, p. 1, Apr. 16, 1996.

Roberts et al., "A field evaluation of in–situ biodegradation of chlorinated ethenes: Part I, methodology and field site characterization," *Ground Water*, vol. 28, No. 4, pp. 591–604 (1990).

Semprini and McCarty, "Comparison between model simulations and field results for in–situ biorestoration of chlorinated aliphates: Part 1. Biostimulation of methanotrophic bacteria," *Ground Water*, vol. 29, No. 3, pp. 365–374 (1991).

Shaw, J.H. and Clewell, D.B., "Complete nucleotice sequence of macrolide–lincosamide–streptogramin B–resistance transposon Tn917 in *Streptococcus faecalis,*" *J. Bacteriology*, vol. 164, No. 2, pp. 782–796 (1985).

Snapper et al., "Isolation and characterization of efficient plasmid transformation mutants of *Mycobacterium smegmatis,*" *Molecular Microbiology*, 4(11), 1911–1919 (1990).

Snapper et al., "Lysogeny and transformation in mycobacteria: stable expression of foreign genes," *Proc. Natl. Acad. Sci. USA*, vol. 85, pp. 6987–6991 (1988).

Speitel et al., "Biodegradation kinetics of *Methylosinus Trichosporium* OB3b at low concentrations of chloroform in the presence and absence of enzyme competition by methane," *Wat. Res.*, vol. 27, No. 1, pp. 15–24 (1993).

Vogt Singer and Finnerty, "Construction of an *Escherichia coli–Rhodococcus* shuttle vector and plasmid transformation in Rhodococcus spp.," *J. Bacteriology*, vol. 170, No. 2, pp. 638–645 (1988).

Wackett et al., "Survey of microbial exygenases: trichloroethylene degradation by propane–oxidizing bacteria," *Applied and Environmental Microbiology*, vol. 55, No. 11, pp. 2960–2964 (1989).

Yeh and Novak, "The effect of hydrogen peroxide on the degradationof methyl and ethyl tert–butyl ether in soils," *Water Environment Research*, vol. 67, No. 5, pp. 828–834 (1995).

Zaidi and Mehta, "The role of inoculum size in the success of inoculation to enhance biodegradation of toxis chemicals at high and low concentrations," American Society for Microbiology, 94th General Meeting Abstracts, Session 121 (1994).

Hanson, J., "Characterization of MTBE–degrading bacterial isolates and associated consortia," UC TSR&TP MTBE Workshop(1998).

Carter B.R., "Biodegradation of MTBE in groundwater under oxygen–enhanced conditions," Sixth International Symposium on In situ and one–sire bioremediation, Lune 4–7, 2001 San Diego, CA.

Deeb, R.A. et al., "MTBE and Benzine Biodegradation by a Bacterial Isolate via Two Independent Monoooxygenase–Initiated Pathways," Symposia papers presented before the Division of Environmental Chemistry, American Chemical Society, Mar. 26–30, 2000.

Hotze et al., "Cinnamate 4–Hydroxylase from *Catharanthus voseus*, and a Strategy for the Functional Expression of Plant Cytochrome $P_{450}$ Proteins as Translational Fusions with $P_{450}$ Reductase in *Escherichia coli*," FEBS Lett., vol. 374, pp. 345–350 (1995).

Marinucci, A.C. and R. Bartha, "Apparatus for monitoring the mineralization of volatile $^{14}C$–labeled compounds", *Applied and Environmental Microbiology*, 38:1020–1022, (1979).

Vanderberg, L.A. and Perry, J.J., "Dehalogenation of *Mycobacterium vaccae* JOB–5: Role of the Propane Monooxygenase," *Can. J. Microbiol.*, vol. 40, No. 3, pp. 169–172 (1994).

\* cited by examiner

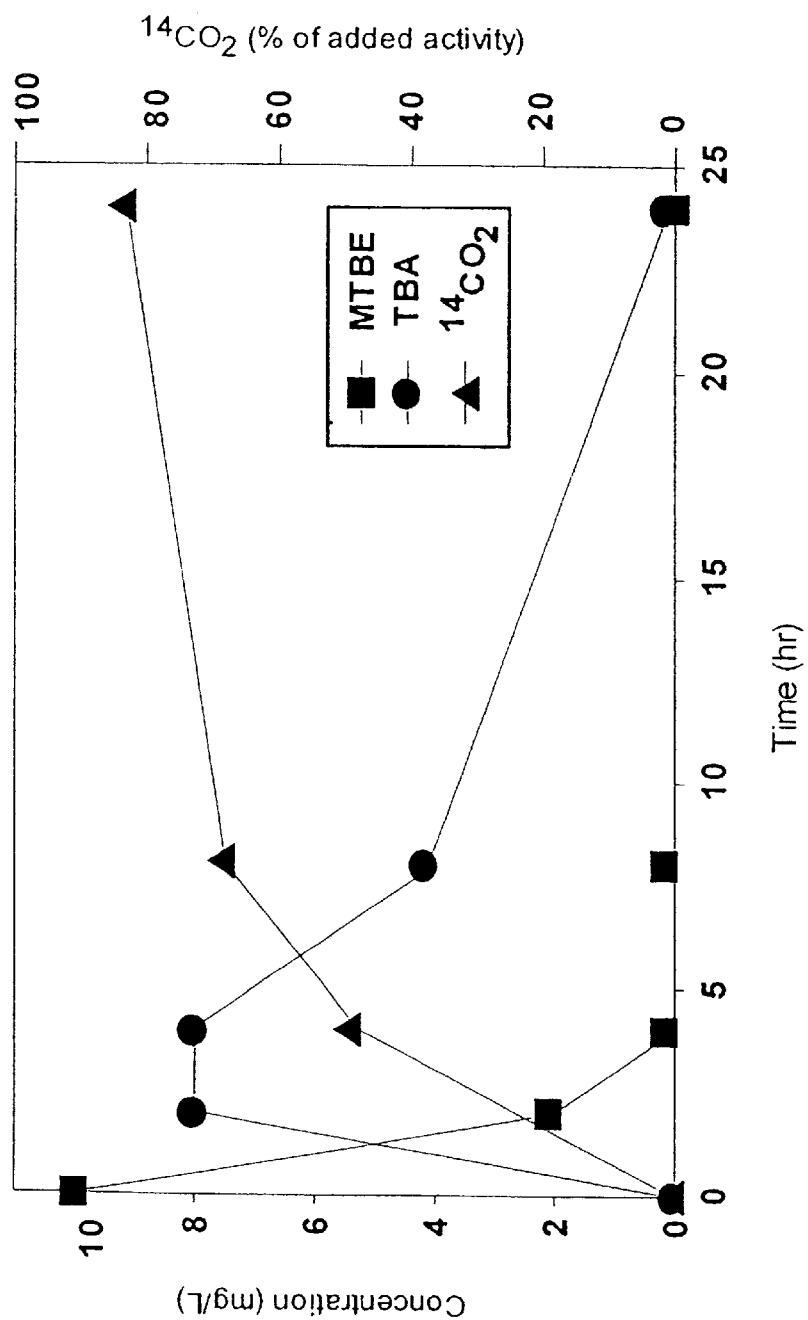
FIGURE 2. Degradation of [u-$^{14}$C]MTBE by ENV735. Symbols are as indicated the graph and represent means of triplicate samples. Standard errors were within the size of the symbols

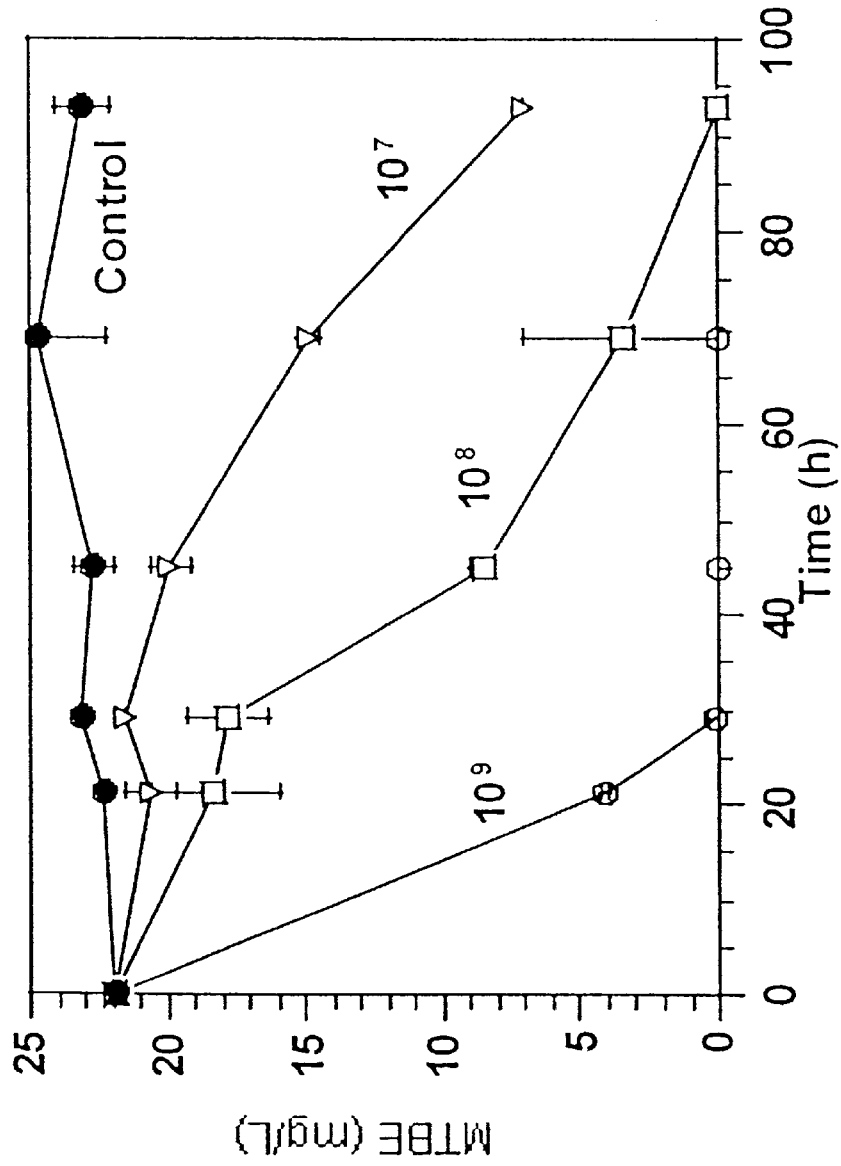
FIGURE 3. Degradation of MTBE in aquifer microcosms by TBA-grown ENV735 added at $10^9$, $10^8$, or $10^7$ cells/mL as indicated. Values represent means (n=3). Error bars represent one standard deviation.

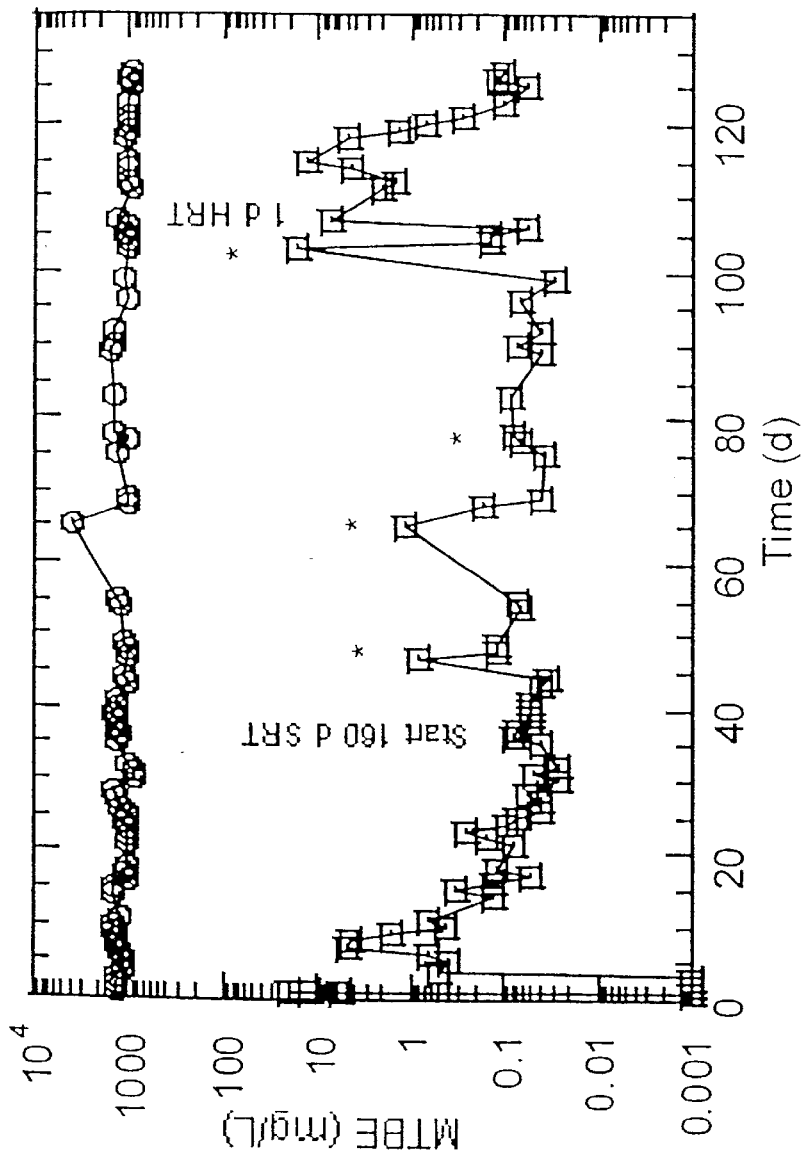

FIGURE 4. MTBE biodegradation in MBR1. The reactor was inoculated with a 16 L culture of ENV735 on day 1, and it received a constant feed of MTBE in 0.4 X BSM. The reactor was operated with an HRT of 3 days until day 106 when the HRT was decreased to 1 day. Circles indicate influent MTBE concentration, and squares indicate effluent concentration. The symbol "*" indicates three feed pump malfunctions and a spike in feed MTBE concentration (>4000 mg/L on day 65).

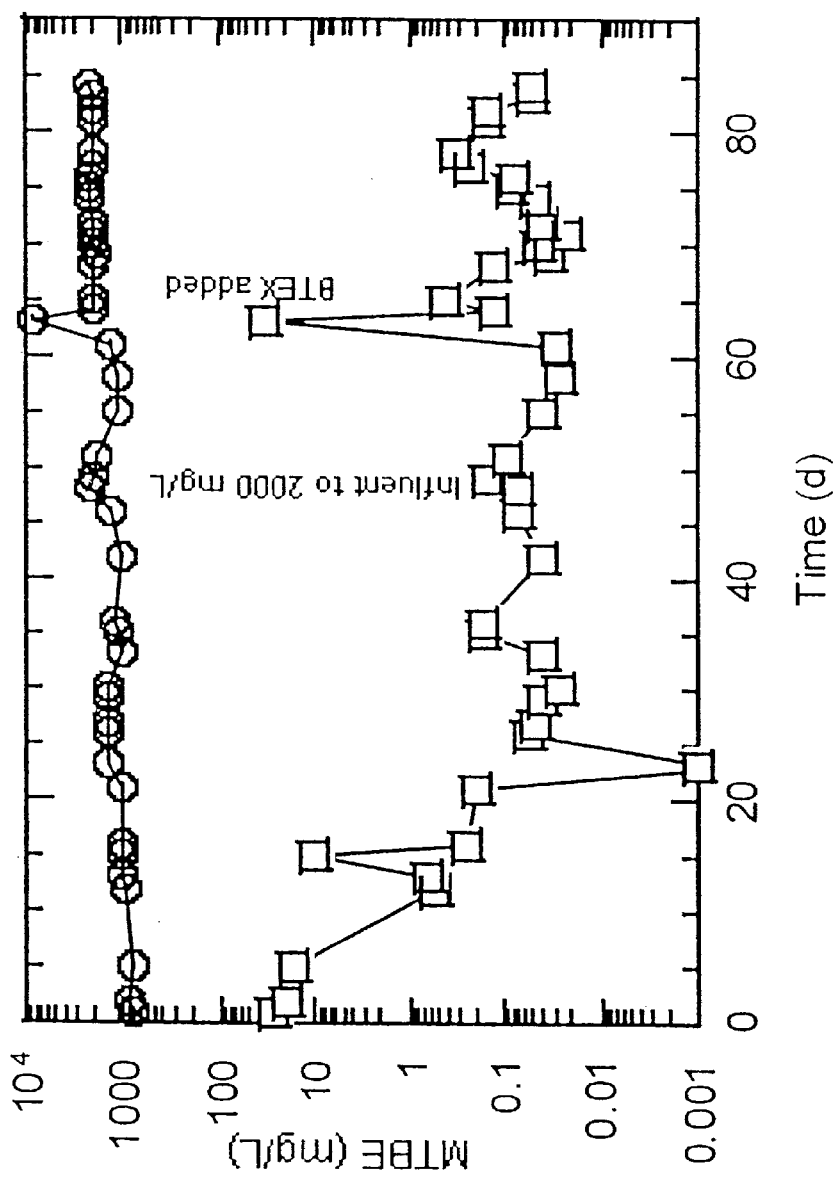
FIGURE 5. MTBE Biodegradation in MBR2. MBR2 was inoculated with a culture from MBR1 and fed MTBE in tap water. BTEX (30 mg/L) addition was initiated on January 20. The HRT was 3 d, and the calculated SRT was maintained at 160 d. Circles are influent MTBE concentration and squares are effluent concentration.

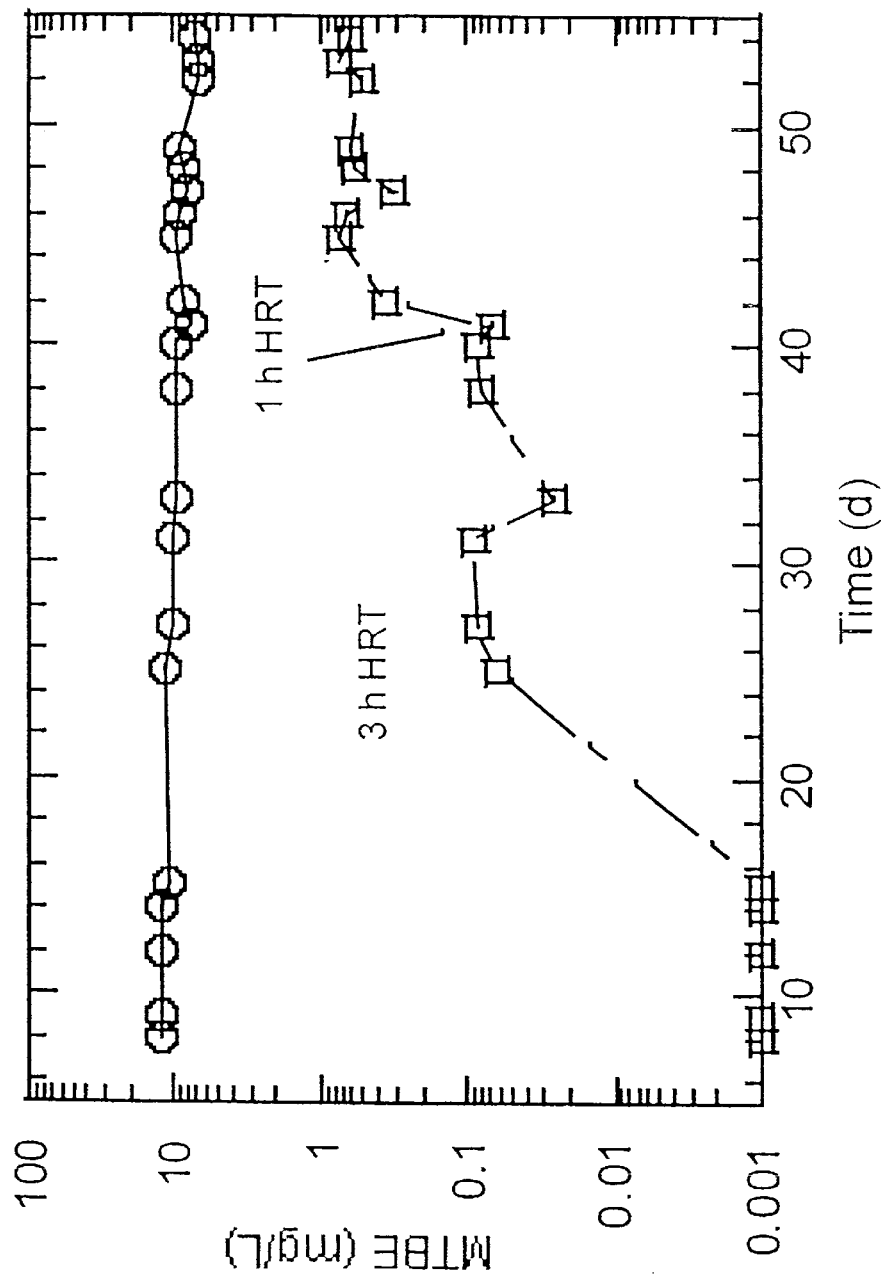
FIGURE 6. Degradation of MTBE in a FBR system. MTBE loading rates at 3 h and 1 h HRTs were 3.3 and 10 mg MTBE/h/L, respectively. Circles represent influent MTBE concentration, and squares represent effluent concentration.

BIODEGRADATION OF GASOLINE OXYGENATES

FIELD OF THE INVENTION

This invention relates to a method for converting undesirable environmental contaminants into environmentally acceptable materials. More particularly, the present invention relates to a biological method for converting organic compounds that are water and soil contaminants into innocuous compounds.

The field of the present invention will be described initially in connection with the contaminant methyl-tert-butyl ether (hereafter also referred to as "MTBE"). It should be understood that the present invention has applicability to the treatment of other "ether" contaminants, as will be described below.

MTBE has been used in "premium" gasoline since 1979 as a high octane additive which functions as an oxygenate. Its use has replaced lead and other additives such as benzene, toluene, ethylbenzene and xylenes, which are often referred to as "BTEX" and which are considered highly contaminating materials. More recently, for areas of the country with relatively high air pollution, the 1990 Clean Air Act requires that oxygenates be used in all grades of gasoline to reduce vehicle emissions which constitute air toxics, for example, carbon monoxide and volatile organic compounds (VOCs). Oxygenates cause fuel to burn more cleanly, reducing the amounts of ozone, carbon monoxide, toxics and other pollutants present in vehicle emissions. The current goal of gasoline reformulation is to reduce gasoline's benzene content by 33% and other contaminating organics by at least 15%.

MTBE is the most widely used oxygenate in the United States. In 1992, more than 1.8 billion gallons of MTBE was used in gasoline. Its use has continued to increase each year since 1992 (Anderson, "Health Studies Indicate MTBE is a Safe Gasoline Additive," *Chemical and Engineering News*, Sep. 20, 1993). MTBE producers have invested billions of dollars into plants already in operation or planned. More than 29 companies now produce MTBE in the U.S. And in 1993, production of MTBE exceeded 24 billion gallons, making it second on the list of organic chemicals produced in the U.S. (M. S. Reisch, *Chemical & Engineering News*, Apr. 11, 1994; p. 12–15).

The toxicity of MTBE is still in question. An Italian study suggested that MTBE poses a significant cancer risk (Trenton Times, Nov. 13, 1994). Other studies have suggested that MTBE is not very toxic to humans (Anderson, "Health Studies Indicate MTBE is Safe Gasoline Additive," *Chemical and Engineering News*, 9–18, Sep. 20, 1993).

Without regard to whether MTBE is or is not toxic, it is a fact that as an ether, it has relatively low odor and taste thresholds compared to other organic compounds. MTBE's odor threshold in water is about 45 to about 95 ppb. Its taste threshold in water is about 134 ppb (American Petroleum Institute 1993). This means that MTBE can be detected in drinking water through odor and taste at relatively low concentrations. The US Environmental Protection Agency has recommended an interim drinking water advisory for MTBE of 35 to 40 ppb. Based on rat model studies, the no-observable-adverse-effect-level (NOAEL) is 100 mg/kg/day (Robinson, M., R. H. Bruner, and G. R. Olson, "Fourteen and ninety day oral toxicity studies of methyl tertiary butyl ether in Sprague-Dawley rats," *J. Am. Coll. Toxicol.*, 9:525–540 (1990)).

The full extent of MTBE contamination in US groundwaters has only recently been under careful assessment. A study performed as part of the US Geological Survey's National Water-Quality Assessment Program revealed that MTBE is the second most commonly detected contaminant in urban groundwaters (Squillace P. J., J. S. Zogorski, W. G. Wilber, and C. V. Price. "Preliminary assessment of the occurrence and possible sources of MTBE in groundwater in the United States, 1993–1994". Environ. Sci. Technol. 30:1721–1730 (1996)). As an example of this widespread problem, Buscheck et al. (Buscheck, T. E., D. J. Gallagher, T. R. Peargin, D. L. Kuehne, and C. R. Zuspan "Occurrence and behavior of MTBE in groundwater. *Proc. Nat. Groundwater Assoc. SW Focused Groundwater Conf.* pp. 2–3. Anaheim, Calif. Jun. 3–4 (1998)) reviewed groundwater data from 700 service station sites in the US and observed that >80% of the active sites and 74% of the inactive sites had MTBE contamination. Approximately 96%, 98%, and 86% of the service station sites in Texas, Maryland, and California, respectively, that analyzed groundwater for MTBE had significant MTBE contamination. Of these sites, 63%, 82%, and 47%, respectively, had MTBE concentrations greater than 1 mg/L. This widespread contamination has led to increased public and regulatory scrutiny, and a need to identify remediation technologies.

The greatest human exposure routes of MTBE are through drinking contaminated water, use of the water in cooking, and inhalation during bathing. The chances of such exposure are not insignificant since vast amounts of MTBE-containing gasoline are stored in underground storage tanks, including tanks that leak. Seepage of MTBE from leaky tanks into groundwater and spillage of MTBE during tank filling operations and transfer operations at distribution terminals have led to considerable contamination of groundwater near these tanks. Because MTBE is highly soluble in water (43,000 ppm), it is now often found as plumes in groundwater near service stations, related storage facilities and filling terminals throughout the United States (American Petroleum Institute, Chemical Fate and Impact of Oxygenates in Groundwater: Solubility of BTEX from Gasoline-Oxygenate Mixtures," Pub. No. 4531, 1991). A market survey by The Jennings Group (1993) estimated that there are greater than 234,000 federally regulated contaminated underground storage tank (UST) sites in the United States and greater than 42,000 hazardous sites.

The recalcitrance of MTBE relative to other gasoline components makes it particularly resistant to inexpensive biological treatment approaches such as bioventing or biosparging. Conversion or "remediation" of the contaminated media to innocuous, environmentally-acceptable compounds, therefore, has been particularly difficult. Furthermore, MTBE can be difficult to air strip from ground water and trap on activated carbon, thereby limiting air sparging/soil vapor extraction (AS/SVE) approaches to remediation. In a recent study of 15 sites, stripping efficiencies of as low as 56% were observed (American Petroleum Institute, supra). And yet this method has been deemed to be the most effective available method for remediating contaminated groundwater.

There are other ether-based compounds that are also widely used and that are considered contaminants. Examples of such ether-based compounds include cycloaliphatic compounds, for example, tetrahydrofuran, a widely used solvent. Examples of other aliphatic ethers which are considered contaminants are ethyl-tert-butyl ether ("ETBE"), tert-amyl methyl ether ("TAME") and diisopropyl ether ("DIPE"), which are used as gasoline oxygenates.

As production of such ether-based compounds continues to grow, it can be expected that the incidence and severity of spills will increase and that the threat to the water supply will become more severe. The present invention is related to the biological treatment of ether compounds to counter such a threat by providing means to efficiently remediate contaminated sites.

Reported Developments

Relatively little work has been done to develop means for biodegrading the aforementioned ethers. In one study, an aerobic consortia isolated from acclimated sludge was maintained on MTBE which served as the sole source of carbon for the consortia (Salanitro, J. P., L. A. Diaz, M. P. Williams, and H. L. Wimiewski, "Isolation of a Bacterial Culture that Degrades Methyl t-Butyl Ether," *Applied and Environmental Microbiology*, Jul. 1994). MTBE was degraded to tertiary-butyl alcohol ("TBA") which was also degraded by the enrichment culture. The consortium is described as comprising at least 6 different uncharacterized bacteria. The physiology of the individual organisms is not reported. It is reported that the consortia appear to have a significant population of nitrifying bacteria.

This culture has been the focus of other remediation demonstrations, including its direct injection into an MTBE-contaminated aquifer at Port Huemeome, Calif. (Salinitro, J. P., C.-S. Chou, H. L Wisniewski, and T. E. Vipond, "Perspectives on MTBE biodegradation and the potential for in situ aquifer bioremediation" *Proceedings of the National Groundwater Association South West Focused Groundwater Conference* pp. 40–54. Anaheim, Calif. Jun. 3–4 (1998)). Other studies have shown that MTBE degraders are present in sewage sludge (Cowan, R. M. and K. Park, "Biodegradation of gasoline oxygenates MTBE, ETBE, TAME, TBA, and TAA by aerobic mixed cultures", *Proc. 28<sup>th</sup> Mid-Atlantic Industrial and Hazardous Waste Conference* (1996); Park, K. and R. Cowan, "Effects of oxygen and temperature on the biodegradation of MTBE", American Chemical Society National Meeting, 37:421–423 (1997)), soils (Yeh, C. K. and J. T. Novak. "Anaerobic biodegradation of gasoline oxygenates in soil", *Water Environment Research*, 66:744–752. (1994)), river sediments (Bradley, P. M., J. E. Landmeyer, and F. H. Chapelle. "Aerobic mineralization of MTBE and tert-butyl alcohol by stream-bed sediment microorganisms", *Environ. Sci. Technol.*, 33:1877–1879 (1999)), and a biofilter inoculated with groundwater (Fortin, N. Y. and M. A. Deshusses, "Treatment of methyl tert-butyl ether vapors in biotrickling filters. 2. Analysis of the rate-limiting step and behavior under transient conditions", Environmental Science and Technology, 33:2987–2991 (1999)). At least partial MTBE degradation has been observed in pure cultures of bacteria (Mo, K., C. O. Lora, A. E. Wanken, M. Javanmardian, X., Yang, and C. F. Kulpa, "Biodegradation of methyl tert-butyl ether by pure bacterial cultures", Applied and Environmental Microbiology, 47:69–72 (1997); Steffan, R. J., K. McClay, S. Vainberg, C. W. Condee, and D. Zhang. Biodegradation of the gasoline oxygenates methyl tert-butyl ether (MTBE), ethyl tert-butyl ether (ETBE), and tert-amyl methyl ether (TAME) by propane oxidizing bacteria", *Applied and Envi- ronmental Microbiology*, 63:4216–4222, (1997)) and fungi (Hardison, L. K., S. S. Curry, L. M. Ciuffetti, and M. R. Hyman, "Metabolism of diethyl ether and cometabolism of methyl tert-butyl ether by a filamentous fungus, a Graphium sp.", *Applied and Environmental Microbiology* 63:3059–3067 (1997)), and one recent study demonstrated growth of a pure culture of Sphingomonas strain PM1 on MTBE as a sole carbon source (Hanson, J. R., C. E. Ackerman, and K. M. Skow, "Biodegradation of methyl tert-butyl ether by a bacterial pure culture" Applied and Environmental Microbiology, 65:4788–4792(1999)).

It appears that in situ degradation of MTBE in aquifers also has not been studied extensively. However, recent unpublished studies by researchers at Mobile Oil Corporation have provided evidence, based on historical concentrations of MTBE in groundwater, that natural attenuation of MTBE may occur over very long periods of time in aquifers. Apparent degradation occurs after the concentrations of benzene, toluene, ethylbenzene or xylene (BTEX) are reduced to low levels. The identity of the organisms responsible for the decline in MTBE was not reported. In further studies, it was observed that MTBE was partially transformed in only one of several anaerobic sediment samples tested (Mormile et al. "Anaerobic Biodegradation of Gasoline Oxygenates: Extrapolation of Information to Multiple Sites and Redox Conditions," *Environ. Sci. Technol.*, 28:1727–1732, 1994). Transformation of MTBE in the one active sample required more than 152 days of incubation, resulted in only about 50% transformation of MTBE, and produced nearly stoichiometric amounts of TBA as a terminal product. It was reported also that MTBE was not degraded by resting cells of two anaerobic bacteria, *Acetobacterium woodii* and *Eubacterium limosum*, which, however, were effective in degrading several un-branched ethers. The authors of the study concluded that MTBE was recalcitrant to both aerobic and anaerobic biodegradation.

In view of the state of the art, it is clear that there is a need for technology that will provide the means for a rapid, efficient and cost effective process for converting MTBE and other environmentally undesirable ether-based compounds into environmentally acceptable compounds.

SUMMARY OF THE INVENTION

In accordance with the present invention, there is provided a method for degrading an ether comprising contacting said ether with a hydrogen-oxidizing bacteria. The present invention also provides a method for degrading a tertiary alcohol comprising contacting the tertiary alcohol with a hydrogen-oxidizing bacteria.

Examples of preferred species of hydrogen-oxidizing bacteria are members of the genus Hydrogenphaga, in particular *Hydrogenphaga flava* strain ENV735. The present invention also provides for isolating hydrogen-oxidizing bacteria by enrichment culture with hydrogen or MTBE as an electron donor.

Another aspect of the present invention includes degrading the ether by contacting it with the bacteria in a bioreactor, for example, a membrane bioreactor or a fluid bed bioreactor.

Still another aspect of the present invention includes degrading the ether with the bacteria in situ. In embodiments utilizing in situ degradation, hydrogen may be added to the subsurface or hydrogen may be produced in situ by passing an electrical current between electrodes.

The present invention provides means for degrading an ether, for example, tert-butyl ethers and/or tert-butyl alcohols efficiently and economically. It can be used to completely degrade these compounds to innocuous compounds, such as $CO_2$ and water. In contrast, the use of prior art techniques result in undesirable degradation products which require further treatment, such as air- or steam-stripping, use of adsorbents such as activated carbon, and large expenditures of energy to burn the contaminant and the associated media. Other advantages of the present invention will become apparent from a consideration of the following detailed description of the invention.

BRIEF DESCRIPTION OF THE DRAWINGS

FIG. 2 is a graph which shows degradation of [u-$^{14}$C] MTBE by ENV735.

FIG. 3 is a graph which shows degradation of MTBE in aquifer microcosms by TBA-grown ENV735.

FIG. 4 is a graph which shows MTBE degradation in a membrane bioreactor (MBR1).

FIG. 5 is a graph which shows the MTBE degradation in a membrane bioreactor (MBR2).

FIG. 6 is a graph showing degradation of MTBE in a fluidized bed reactor (FBR) system.

DETAILED DESCRIPTION OF THE INVENTION

Figure 1:
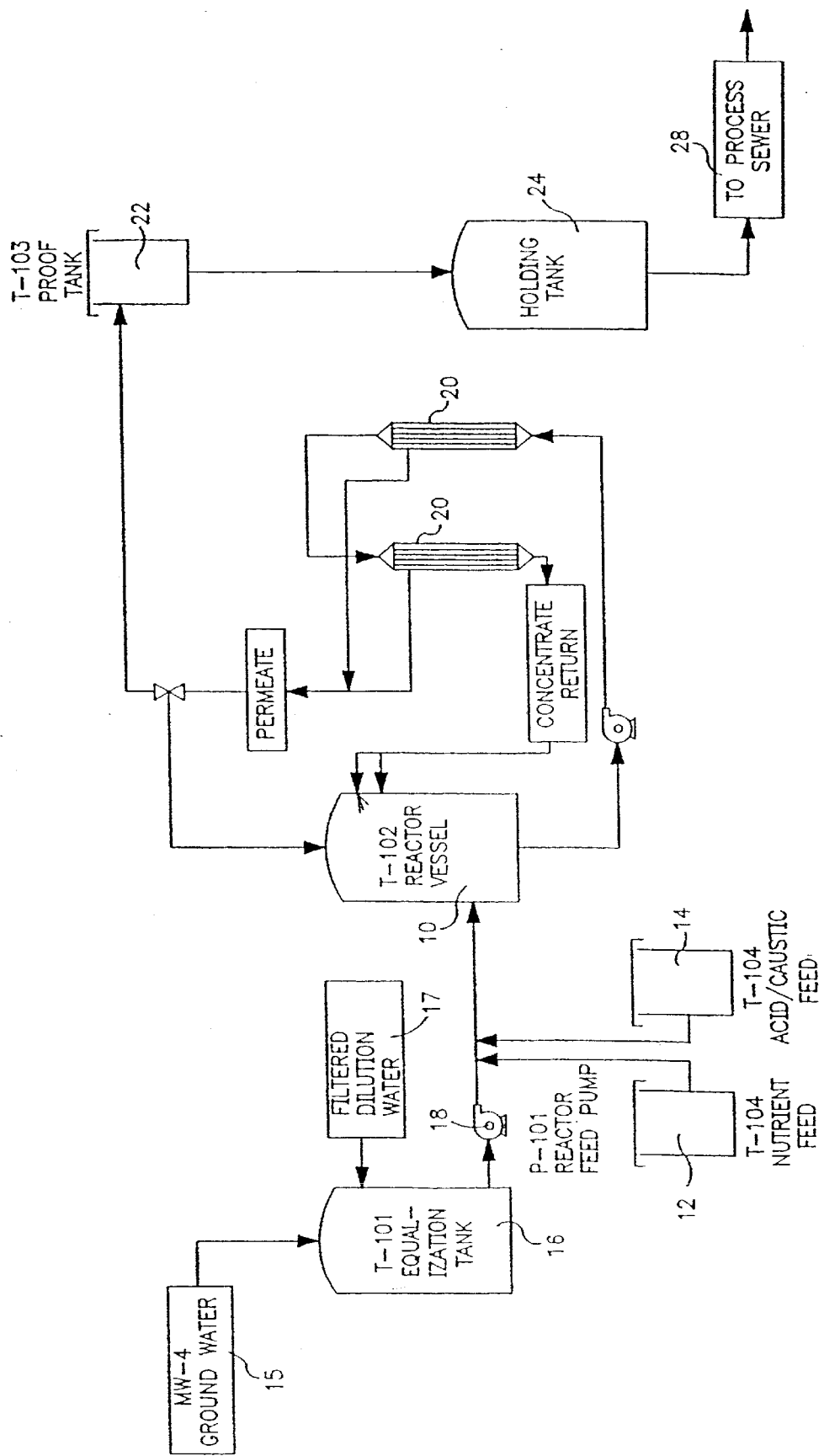
FIG. 1 is a diagrammatic representation of a membrane bioreactor system.

The present invention involves the discovery that bacteria capable of oxidizing hydrogen are capable of degrading various types of undesirable ether-based environmental contaminants (also referred to herein as an "ether"). The ether may be aromatic or aliphatic, for example, a cyclic, a straight-chain or a branched-chain ether. Particularly good results have been achieved with ethers that have in their structure a tertiary carbon atom, that is, a carbon atom which does not have a hydrogen atom bonded to it. The tertiary carbon atom is completely substituted, for example, with alkyl groups, including, for example, lower alkyl groups, that is, alkyl groups having 1 to about 5 carbon atoms.

Examples of such ether-based environmental contaminants are compounds used as gasoline oxygenates or solvents, in particular, tertiary alkyl ethers, such as the gasoline oxygenates methyl tert-butyl ether ("MTBE"), ethyl tert-butyl ether ("ETBE") and methyl tert-amyl ether ("MTAE", but referred to commonly as "TAME"). Other types of ether-based compounds which can be treated in accordance with the present invention include diisopropyl ethers and saturated cyclic ethers, such as tetrahydrofuran, a material which is widely used in solvents and in chemical bulk products. A mixture of two or more ethers can also be treated in accordance with the present invention. Such ethers can be completely degraded by the hydrogen-oxidizing bacteria of the present invention.

The present invention involves, additionally, the discovery that degradation products of ethers which are treated in accordance with the present invention and which include —OH groups, can also be degraded utilizing the bacteria described herein. Tert-butyl alcohols ("TBA") are examples of such materials. In general, the present invention is effective in degrading an ether completely to carbon dioxide and water and such degradation can be effected through an intermediate compound, for example, an alcohol.

It is believed that the present invention will be used widely to degrade MTBE which is by far the most common compound used as a gasoline oxygenate. MTBE is a volatile, flammable, colorless liquid at room temperature and has a terpene-like odor. It is miscible in gasoline and is soluble in water, alcohol and other ethers.

A wide variety of materials in which the ether is present may be remediated or decontaminated in accordance with the present invention. Examples of such materials include soils, sludges, sediments, dredge tailings, contaminated gasses, chemical waste and the like. It is believed that the most widely used application of the present invention will involve the treatment of contaminated water, in particular, contaminated groundwater present in urban aquifers and wells.

Methods for determining if a given media is contaminated are well known in the art and include gas and liquid chromatography. For example, MTBE can be detected by gas chromatography according to the EPA method 8260B as described in U.S. EPA publication SW846 US EPA 1986; Test methods for evaluating solid wastes, United States Env. Protection Agency Pub. No. SW 846 or EPA Method 8015B, as described in U.S. EPA Publication SW846 EPA (1986). Other methods for detecting contamination, such as high performance liquid chromatography (HPLC) may be used, if desired.

The desired extent to which the contaminated material is decontaminated of the ether will usually be defined on a site-specific and material-specific basis. The level of remediation performed at a given site will depend on the intended or actual use of the material contaminated. In most situations, it is desirable to lower the concentration of the ether-based environmental contaminant to levels as low as possible. For example, in treating contaminated water, it would be desirable to reduce the ether-based contaminant concentration to below a level at which the ether is detectable by odor and taste. Thus, in situations where MTBE is present in water that may be used for cooking, drinking or bathing, it would be desirable to lower the level of MTBE to at least below EPA drinking water advisory level of 35 to 40 ppb. Lower levels can be achieved, for example, to levels below MTBE's average taste threshold of about 134 ppb, and even below MTBE's odor threshold in water of 45–95 ppb. Many states have their own standards on the level of contamination that is acceptable in groundwater. In general, the levels of allowable contamination in groundwater are set at about 10 to about 700 ppb. The present invention is capable of being used to degrade the ether-based contaminants to levels at least below current environmental standards.

Microorganisms for use in the practice of the present invention include hydrogen-oxidizing bacteria alone or in combination with propane- or isopropanol-oxidizing bacteria as disclosed in published PCT application WO 98/01241. A method for identification of strains of hydrogen-oxidizing bacteria capable of degrading ethers is described below in the Example section.

Developmental work associated with the present invention has included isolation of a bacterial strain, namely, ENV735.

Strain ENV735 is a Gram negative rod-shaped bacterium. Growth substrates for the strain are shown in Table 1.

TABLE 1

Growth Substrates for ENV735

| Substrate | Growth[1] |
|---|---|
| MTBE | + |
| MTBE + casamino acids (0.01%) | ++ |
| MTBE + yeast extract (0.01%) | +++ |
| TBA | +++ |
| TBA + yeast extract | +++ |
| 1-Propanol | +/− |
| 2-Propanol | − |
| Propionic acid | − |

TABLE 1-continued

Growth Substrates for ENV735

| Substrate | Growth[1] |
|---|---|
| Pyruvic acid | +/− |
| Propane | +/− |
| Iso-Pentane | − |
| Sodium acetate | +/− |
| Lactic acid | +/− |
| Glutamic acid | +/− |
| 2-Hydroxy isobutyric acid | + |
| Methanol | − |
| Corn steep liquor | ++ |
| Casein | + |
| Tyrptone | + |
| Sucrose | +++ |
| Yeast extract | +++ |
| Luria broth | +++ |
| R2A agar plates | +++ |

[1](−) no growth; (+/−) very slow or questionable growth; (+) slow growth increased turbidity after ~7 days; (++) increased turbidity after ~3 days; (+++) measurable increase in turbidity after 1 day.

Fatty acid analysis indicated that the strain was most closely related to bacteria of the genus Hydrogenophaga (similarity index=0.720), and 500 bp 16s rRNA analysis indicated that the strain is most closely related to *Hydrogenophaga flava* (0.58% difference from the library strain). The strain grew readily on $H_2$ as a sole energy source.

The strain ENV 735 was deposited with the American Type Culture Collection (ATCC), 10801 University Blvd., Manassas, Va. 20110-2209 on Jun. 28, 2000 as Patent Deposit Designation PTO-2158. The deposit of ENV 735 will be maintained without restriction in the ATCC depository for a period of 30 years, or 5 years after the most recent request, or for the effective life of the patent, whichever is longer, and will be replaced if the deposit becomes non-viable during that period.

The present invention includes within its scope the use of mutagenesis to improve the ability of the microorganisms to degrade a given contaminant or to survive in a given contaminated medium. Standard bacterial mutagenesis techniques known in the art may be employed to mutagenize bacteria. Alternatively, the bacteria may be modified using genetic engineering to add or delete given genes that effect the bacteria's ability to degrade a given contaminant.

The present invention includes also within its scope the use of one or more other microorganisms in combination with one or more of the microorganisms described herein to achieve complementary degradation against a mixture of contaminants which includes an ether, for example, in the treatment of mixed waste streams. Such a combination utilizes the different degradative specificities of the involved microorganisms. Accordingly, for certain applications, a given contaminated medium may be treated with microorganisms having different specificities for given contaminants or their degradative intermediates.

In applications in which the contaminated site comprises mainly one or more ethers, satisfactory results can be achieved utilizing microorganisms that comprise approximately 100% of hydrogen-oxidizing microorganisms. Accordingly, a pure culture of a hydrogen-oxidizing microorganism can be introduced to the contaminated media for remediation. Alternatively, other microorganisms capable of degrading the contaminant or its degradative by-products can be used. In some instances, the growth of such other microorganisms may be aided by the presence of the hydrogen-oxidizing microorganisms that are introduced as a pure culture. For most applications involving mainly an ether contaminant, it is recommended that the hydrogen-oxidizing microorganisms comprise at least a majority of the degradative microorganisms initially present during remediation. Thus, hydrogen-oxidizing microorganisms will constitute greater than 50% of the microorganisms which are present in the contaminated media and which are capable of participating in the degradation of the contaminant(s).

Any suitable carbon source and suitable conditions can be used to increase the cell population of the involved microorganisms. Such increase is referred to herein as "growth of the microorganisms" and materials for use in effecting the growth are often accompanied by use of the term "grown on". For example, the hydrogen-oxidizing bacteria may be grown on sucrose. Such compounds can serve as the exclusive source of carbon for the microorganism.

There are applications in which it can be advantageous to use other materials to grow the hydrogen-oxidizing microorganisms.

Conventional bacterial growth media can also be used to effect an increase in cell population. Examples of such growth media are: Lauria broth (Gibco/BRL); Trypticase soy agar (BBL; Bectin/Dickinson, Cockysville, Md.); R2A (Difco Laboratories, Detroit, Mich.); and nutrient broths, including casamino acids and/or yeast extract.

Once the cell population has reached a desirable level, it may be desirable to transfer the cells to a growth media which promotes expression of the genes responsible for degradation of the contaminant.

Growth of the bacteria can be effected in a bioreactor or in situ and can be enhanced by the addition of growth substrates which are more readily metabolized by the microorganisms.

A media which is contaminated with an ether-based compound and/or the degradation products of these ethers can be contacted with hydrogen-oxidizing bacteria either at the site of contamination or by transferring the contaminated media to a bioreactor for remediation off-site. Treatments that occur outside the contaminated environment, or that involve treating contaminated media in bioreactors, are commonly referred to as "ex situ" treatments.

A variety of bioreactors known to those of skill in the art may be used in the practice of the present invention. Suspended growth reactors, such as membrane bioreactors, standard continuously stirred tank reactors (CSTRs) and activated sludge systems may be used in the practice of the invention. Alternatively, and because bacteria adhere strongly to surfaces, fixed film reactors, such as fluidized bed reactors or fixed support reactors, may also be used, if desired.

It is believed that a suspended growth reactor, in particular, a membrane bioreactor, will be particularly efficient. An example of a membrane bioreactor is presented in FIG. 1. The membrane bioreactor system consists of a tank or reactor vessel 10 equipped with a variable speed mixer, an air diffuser, an automated pH controller and nutrient 12 and acid/caustic feed 14 systems. Groundwater 15 or other contaminated liquid media is introduced from an equalization tank 16 via a reactor feed pump 18. If desired, dilution water 17 may be added to the equalization tank. Effluent from the reactor vessel 10 is passed through membrane filters 20 which retain the microorganisms present in the reactor vessel 10 but allow the effluent containing the degradation products of the ether to pass. The membrane filters 20 may be placed within the reactor vessel 10, or they may be outside of the reactor vessel 10.

Effluent from the bioreactor may be sent to a proof tank 22 which is used to hold the effluent so that it can be analyzed before passing the effluent along to a holding tank 24 and subsequently discharging into the sewer system 28.

Soda ash, caustic solutions containing, for example, NaOH or KOH, or acids may be used to control pH and soluble fertilizer may be used to supply nutrients to the microorganisms. In preferred embodiments, the fertilizer or other nutrient source supplies nutrients at a ratio of about 100 parts carbon to about 10 parts nitrogen to about 1 part phosphate (100:10:1). Examples of fertilizer acceptable in the practice of the present invention include fish oil emulsion or any other soluble agricultural fertilizer, such as Agway 20–20–20 or Lesco 19–19–19, ammonium chloride or ammonium nitrate-based fertilizers and potassium or sodium phosphate-based fertilizers, or phosphoric acid. The liquid level in the reactor may be controlled by equipment available in the art designed to maintain reactor liquid volume.

When a membrane bioreactor is used, effluent from the reactor may be passed over ultrafiltration membranes or other filtration apparatus. Examples of ultrafiltration membranes useful in the practice of the invention are Rhone-Poulenc Model SC37/K09, and Zenon ZeeWeed membranes.

Operation of the bioreactor will usually have two phases: an initial batch operation and then continuous operation. Batch operation is used to produce large amounts of degradative biomass within the reactor system, and to acclimate the degradative organisms to the contaminant feed. The following description is illustrative of an operation involving the use of hydrogen-oxidizing bacteria.

Batch operation can be initiated by inoculating the reactor with the hydrogen-oxidizing microorganism and then adding tertiary butyl alcohol, for example, to a final concentration of from 0.1 to 1% (v/v). The organisms are aerated and allowed to grow until no tertiary butyl alcohol remains in the culture medium. Additional tertiary butyl alcohol can then be added to further increase biomass levels. After sufficient biomass is obtained, a small amount of contaminant (e.g., MTBE) can be added to acclimate the organisms. Additional contaminant can be added after depletion of the prior addition. When sufficient degradation rates are achieved, the reactor can be operated in a continuous mode. Preferably, during continuous and batch operation, the reactor should be operated at a temperature of between 25 and 37° C., with the pH in the range of 6.8 to 7.2, and a dissolved oxygen concentration >2 mg/L. Hydraulic retention time within the reactor should be adjusted to allow sufficient time for degradation of the target compound to below treatment standards. During laboratory testing, a hydraulic retention time of 2.5 hr to 3 days was sufficient to degrade >90% of influent MTBE. Furthermore, the volatile suspended solids (biomass) concentration should be maintained at a relatively high concentration, preferably from 1,000 to 30,000 mg/l depending on the contaminant loading rate.

In certain circumstances, it may be more convenient or economical to treat a contaminated site in place (in situ). The following description is illustrative of an operation involving the degradation of gasoline oxygenates.

Most environmental contamination by gasoline oxygenates occurs in the subsurface—either in the unsaturated (vadose) or saturated zones of soils. Gasses can be added readily to the subsurface either by injection/vapor extraction (vadose zone), by in situ gas sparging (saturated zone) (Marley, M. C., E. X. Droste, H. H. Hopkins, and C. J. Bruell, 1996, Use Air Sparging to Remediate, *Environ. Engineer. World*, Mar.–Apr. 6–14, 1996), or by using bubbleless diffusion devices. When the techniques are used to stimulate the growth and activity of natural pollutant degrading microorganisms, they are referred to "bioventing" and "biosparging", respectively, and "biostimulation" collectively. It is, therefore, possible to perform in situ remediation of gasoline oxygenates by injecting gaseous co-substrates (e.g., hydrogen) into the subsurface to stimulate biodegradation of gasoline oxygenates by naturally-occurring hydrogen-oxidizing bacteria. The use of gas (methane) injection to remediate aquifers contaminated with trichloroethylene has been demonstrated. See, for example: (A) Lombard, K. H., J. W. Borthen and T. C. Hazen, 1994, The design and management of system components for in situ methanotrophic bioremediation of chlorinated hydrocarbons at the Savannah River Site, in: R. E. Hinchee (ed.), *Air Sparging for Site Remediation*, Lewis Publishers, Boca Raton, Fla., pp. 81–96; and (B) Hazen, T. C. et al., 1994, Summary of in situ bioremediation demonstration (methane biostimulation) via horizontal wells at the Savannah River Site Integrated Demonstration Project, in: *In Situ Remediation: Scientific Basis for Current and Future Technologies*, Battelle Press, Richland, Wash., pp. 137–150.

In a standard air sparging method, clean air is injected into an aquifer beneath the water table. Volatile organic components dissolved in the groundwater are forced into the vapor phase due to mass transfer. The contaminated vapors migrate from the saturated portions of the aquifer to the unsaturated or "vadose" zone above the water table. Migration of the organic vapors from the aquifer to the vadose zone may be controlled by soil vapor extraction (SVE) techniques. SVE usually employs vacuum pumps located at the surface connected to vapor extraction wells which pass through the vadose zone and which draw the contaminated vapors to the surface. The extracted vapors are then treated using a variety of ex situ treatments schemes including carbon absorption, catalytic oxidation, biofiltration or condensation.

The techniques of in situ air sparging can readily be adapted to the treatment of an area contaminated with an ether-based compound, such as MTBE. In particular, rather than injecting clean air, a gas, such as hydrogen or propane, can be added readily to the subsurface either by injection/vapor extraction (vadose zone) or by in situ gas sparging (unsaturated zone). Injection/vapor extraction is effective in treating the vadose (unsaturated) zone of the subsurface, and relies on gaseous diffusion of added substrates (e.g., hydrogen and air) through the unsaturated soils. Soil vapor extraction is used to direct the flow of the added gasses, and to remove and capture any volatile contaminant. In many cases, depending on the composition of the soils, this method allows treatment of large areas of contaminated soils at a low cost. In situ gas sparging involves injecting gaseous substrates (e.g., hydrogen) directly into the saturated zone of the subsurface. This process facilitates the dissolution of the substrates into the aqueous phase of the aquifer, thereby allowing indigenous or added organisms to use the substrates as a source of energy for growth and degradation.

Vapor extraction can be coupled with in situ sparging to capture gasses that do not completely dissolve into the aqueous phase. In effect, injection/vapor extraction allows remediation of the unsaturated zone of the subsurface by stimulating degradative organisms in the unsaturated soil, whereas in situ sparging allows remediation of the saturated zone of the subsurface by stimulating organisms in the aqueous phase of the aquifers or attached to the saturated soils. Accordingly, in situ remediation of a given ether-based contaminant, such as MTBE, may be accomplished by injecting gaseous co-substrates, such as hydrogen and air or oxygen into the subsurface to stimulate the biodegradation of the ether by naturally-occurring hydrogen-oxidizing bacteria.

Alternatively, the microorganisms disclosed in the present invention may be added in situ at the site of the contamination, followed by the provision of hydrogen and air to stimulate the growth and activity of these introduced microorganisms.

Typically, microorganisms which are to be used for in situ remediation are cultured, that is, grown in fermentors to high cell density ($>1\times10^{10}$) using either simple growth substrates such as sucrose or tertiary butyl alcohol, on rich bacteriological media such as trypticase soy broth or yeast extract, or on the target contaminant (e.g., MTBE). If necessary, cells grown on simple substrates can be exposed to the target contaminant near the end of the fermentation process to insure induction of degradative genes (e.g., in the presence of MTBE). The organisms can then be concentrated by centrifugation or ultrafiltration, or they can be shipped directly to location of injection. Alternatively, cultures of the organisms can be grown directly on site and injected batchwise or continuously into the contaminated media. The microorganisms can be diluted prior to injection, or injected in a concentrated form. Ideally, the final concentration of the organisms in the contaminated media will be from about $1\times10^6$ to about $1\times10^9$ cells/ml (gm) of contaminated media. Alternatively, the organisms can be injected at a lower initial concentration (e.g., $1\times10^5$ cells/ml) and additional growth substrate can be added to promote growth of the organisms within the contaminated media.

Injection of the organisms can be achieved by adding the organisms to an injection well composed of suitable pipe screened in the desired injection zone, or into a re-injection stream of water removed from one location of the aquifer and re-injected into another area. The microorganisms can also be injected in an air or fluid stream used to facilitate fracturing of consolidated aquifer materials by processes known in the art, such as pneumatic or hydraulic fracturing, respectively.

To perform in situ bioremediation, a preferred system involves use of small diameter wells of approximately 1 to about 4 inches in diameter which are drilled at the site of the contamination, with the bottom portion of the well located several feet below the water table. The injection rates of the desired gas will vary depending on the type of gas and the nature of the soil or other media surrounding the well. However, in general, a gas flow rate of a few cubic feet per minute, preferably greater than about 10 to about 15 CFU/min is utilized. When injecting a given gas into a saturated aquifer, sufficient pressure will be required to overcome the sum of the hydrostatic pressure of the overlying groundwater in the air and entry pressure of the underground soil or sediment formation.

Guidance on the parameters for determining the appropriate flow rates for inducing a gas in an air sparging system and construction of air sparging systems may be found in a variety of publications, including, "Use of Air Sparging to Remediate," by M. C. Marley et al., *Environmental Engineering World*, March–April 1996; "Removing Gasoline from Soil and Groundwater Through Air Sparging," by Michael C. Marley, *Remediation*, Spring 1992; and "Successfully Applying Sparging Technologies," by Michael C. Marley and Edward X. Droste, *Remediation*, Summer 1995. The information in these publications may be adapted for use in the present invention by replacing air with the desired gas, such as hydrogen. In the case of the hydrogen-oxidizing bacteria which have been found to be useful in the practice of the present invention, air, combined with hydrogen gas, may be injected into the subsurface by inserting the injection wells into either the vadose or saturated zones. Vapor extraction wells can then be inserted into the vadose zone to capture the gases and direct the flow of gas within the subsurface. Co-substrates such as hydrogen and air or oxygen can be injected simultaneously or by pulsing in one co-substrate followed by another. As an example, hydrogen can be injected for 4 hours, followed by injection of oxygen for 4 hours.

The concentration of MTBE or other contaminant in the contaminated zone can be monitored by analyzing the gas recovered in the vapor extraction system or by monitoring liquid phase concentrations of the contaminant in the groundwater. Quantification of the increase in numbers of oxidizing bacteria may be monitored by recovering soil or water samples from the subsurface and spreading samples on the surface of BSM agar plates. Plates are incubated in a sealed jar containing an atmosphere of the gaseous growth medium (e.g., hydrogen) and air. Colonies of oxidizing bacteria are enumerated by counting the colonies that form on the plates.

In one embodiment of the present invention hydrogen is produced in situ by applying an electrical current between two or more electrodes at a current and voltage sufficient to split water molecules (electrolysis) or reduce protons (proton reduction). In the former application, two water molecules are dissociated to form two molecules of molecular hydrogen ($H_2$) and one molecule of molecular oxygen ($O_2$). In the latter application, electrons effectively reduce hydrogen ions (H+) resulting in the formation of molecular hydrogen without dissociating water or the formation of molecular oxygen. In some cases, both processes can occur simultaneously. The amount of current and voltage required to drive each process and the position of the electrodes are determined by site specific factors such as soil resistivity, configuration of the contaminant plume, groundwater hydrology, and subsurface geology. Thus, the exact system configuration is typically selected and designed by those skilled in the art on a site-by-site basis, but it will usually consist of the following components: 1) a power supply to produce an electrical current; 2) two or more electrodes inserted into the subsurface and configured so that hydrogen will be generated in, around, upgradient, or downgradient of the contaminant plume or source area; 3) monitoring wells or sampling points through which media (groundwater, soil, or gas) can be sampled to evaluate changes in hydrogen, oxygen, and/or contaminant concentrations; and, 4) additional equipment or devices to add supplemental oxygen and/or nutrients, and/or to alter groundwater flow.

In situ hydrogen production systems can be configured in a number of ways to address specific site conditions. In one embodiment, electrode pairs (cathodes and anodes) can be configured to create a permeable barrier or fence aligned perpendicular to groundwater flow and transecting the ether-containing aquifer. This approach will supply hydrogen and oxygen to support the growth and degradative activity of ether-degrading, hydrogen-oxidizing bacteria between the electrodes and downgradient of the electrode fence. Hydrogen generation can be performed continuously, or it can be controlled with timers to allow periodic in situ hydrogen production. The polarity of the electrodes also can be reversed to switch the location of the cathode and anode, and, consequently, the location of hydrogen generation. In other configurations, a single cathode can be surrounded by an array of anodes (or vise-versa), or both anode and cathode can be installed in a single well with or without the use of a system to circulate groundwater within or outside of the well. The electrodes can be composed of any conductive material including, but not limited to, metals such as iron, nickel, zinc and titanium, conductive ceramics, or synthetic materials.

EXAMPLES

The following examples are illustrative of the practice of the present invention and demonstrate its use to degrade effectively MTBE and TBA. The examples include degradation of MTBE in a bioreactor, fluidized bed reactor, and degradation of MTBE in situ.

Bacterial Strains and Growth

To isolate an MTBE-degrading bacterium MTBE-contaminated groundwater and colonized activated carbon from a laboratory fluid bed bioreactor treating MTBE were added to basal salts medium (BSM; Hareland, W., R. L. Crawford, P. J. Chapman, and S. Dagley, metabolic function and properties of 4-hydroxyphenylacetic acid 1-hydrolase from *Pseudomonas acidovorans*, *Journal of Bacteriology*, 175:272–285(1975)) containing 25 mg/L MTBE. The culture was incubated at 25° C. with shaking until an increase in turbidity was observed. The activated carbon was allowed to settle, and a portion of the culture liquid was added to a new flask of BSM with MTBE, and the process was repeated. After 4 rounds of enrichment, a portion of the culture was streak plated onto R2A agar plates (DIFCO) and individual colonies were allowed to form. Individual colonies were added to fresh BSM with MTBE and screened for growth. Cultures that grew were streaked again on R2A plates and evaluated microscopically to assess culture purity. One isolate was selected for further studies and designated strain ENV735. To characterize strain ENV735, a subculture of the strain was plated on R2A agar plates and sent to Acculabs, Inc. (Newark, Del.) for fatty acid and rRNA sequence analysis. Fatty acid analysis involves the gas chromatography characterization of fatty acid molecules composing the cell envelopes of bacterial cells (see for example, Van Schie, P. M. and L. Y. Young, "Isolation and characterization of phenol-degrading denitrifying bacteria". *Applied and Environmental Microbiology*, 64:2432–2438 (1998); Welch, D. F. 1991. "Application of cellular fatty acid analysis", *Clinical Microbiology Review*, 4: 422–438 (1991)). The resulting fatty acid profile of the test strain is compared to a library of profiles from well-characterized bacterial strains to identify the taxonomy of the test strain. The analysis of 16s rRNA is one of the most common methods used by those skilled in the art to identify bacteria. The analysis involves determining the nucleic acid sequence of the 16S rRNA gene sequence of the test organisms. The resulting DNA sequence is compared to a library of DNA sequences from well-characterized bacteria to determine the taxonomy of the test strain.

To isolate hydrogen oxidizing bacteria, approximately 5 g of turf soil or 5 ml of sludge from the Hamilton, N.J. wastewater treatment facility was added to 100 ml of BSM medium in an 250-ml Erlenmeyer flask fitted with a rubber stopper. The rubber stopper was pierced with an 18 gauge needle onto which was fitted a two-way stopcock. The headspace of the flask was filled with a gas mixture containing approximately 60% $H_2$, 10% $CO_2$, 25% $N_2$, and 5% $O_2$. The flasks were then placed on a shaker and incubated for several days, or until the culture turbidity increased. The headspace of the flask was flushed daily with the gas mixture to insure the availability of $H_2$ and $O_2$. The culture was then sub-cultured as above until an active $H_2$-oxidizing culture was selected.

The bacterial strains *Hydrogenophaga flava* (ATCC 17724) and *Hydrogenophaga palleronii* (ATCC 33667) were grown on rich media (YE or LB) on BSM with hydrogen as described above. Pure cultures of $H_2$-oxidizing bacteria were grown as described above, accept that a sterile 0.2 mm filter cartridge was placed between the influent stopcock and the needle to prevent contamination.

Example 1

MTBE Degradation Assays

MTBE biodegradation assays were performed as previously described (Steffan et al., 1997 supra). Cells grown in either rich medium (LB or 0.4% YE in BSM), or BSM+ MTBE (75 mg/L), TBA (100 mg/L), or succrose (0.5% w/v) were collected by centrifugation, washed, and suspended in BSM to an optical density at 550 nm (OD550) of 1, unless otherwise indicated. Subsamples of the cultures were placed in 60-mL serum vials, and MTBE was added the culture as either neat compound or an aqueous solution depending on the desired final concentration. For high concentration MTBE assays, cultures were placed in 160-ml serum vials to insure oxygen availability. Vials were sealed with Teflon-lined septa and incubated on their side with shaking at 25° C.

To measure the amount of MTBE in the vials a portion of the culture liquid was removed, centrifuged, and analyzed by gas chromatography (GC) as previously described (Steffan et al., 1997 supra). GC response with the samples was compared to the response of a three to five point standard curve. This method had a detection limit of ~300 µg/L. When a lower detection limit was desired, the samples were analyzed by using EPA Method 8260B (EPA, supra) which had a detection limit of approximately 5 µg/L. Tert-butyl alcohol concentrations in the culture liquid was measured by first centrifuging cultures to pellet the cells, and then injecting a sample of the culture on to a gas chromatograph and comparing the response to a standard curve. This method had a detection limit of approximately 500 µg/L. If lower detection limits were desired the samples were analyzed by using EPA Method 8015B (EPA supra) which had a detection limit of approximately 5 µg/L.

To confirm MTBE mineralization, cells were incubated with uniformly labeled [$^{14}C$]MTBE. Cells were collected by centrifugation, washed, and suspended in BSM to an $OD_{550}$ of 1.0. Ten ml of cell suspension was placed in a 30-ml serum vial, amended with 1.36 µCi uniformly labeled [$^{14}C$] MTBE (10 mCi/mmol) in 2.5 mL ethanol and 2 mg/L MTBE, and incubated at 25° C. At timed intervals air was passed through the samples and organic compounds and $^{14}CO_2$ in the effluent air were trapped (Marinucci, A. C. and R. Bartha, "Apparatus for monitoring the mineralization of volatile $^{14}C$-labeled compounds", *Applied and Environmental Microbiology*, 38:1020–1022, (1979)). Oxosol C14 (National Diagnostics, Atlanta, Ga.) served as a $CO_2$ trapping solution and liquid scintillation cocktail. The amount of $^{14}CO_2$ produced was quantified by liquid scintillation counting.

Regardless of the growth substrate used, MTBE degradation occurred without a lag period (FIG. 2). The initial maximum MTBE oxidation rate at 30° C. with YE-grown cells and 25 mg/L MTBE was 86 nmole MTBE/min./mg total cell protein. MTBE degradation rates were higher with cells grown on rich medium (LB or 0.4% YE) than with cells grown on either MTBE or TBA. Approximately 80% of the added [$^{14}$C]MTBE (10 mg/L) added to YE-grown cells was recovered as $^{14}CO_2$ within 24 hr. (FIG. 2). Strain ENV735 was able to degrade MTBE at concentrations as great as 3000 mg/L and the pH optimum for MTBE degradation by strain ENV735 was 7.0. MTBE degradation was not inhibited by the presence of $H_2$, nor was it affected by 30 mg/L of the gasoline components benzene, ethylbenzene, toluene and zylenes (BTEX) provided as a mixture of equal parts of each compound.

When YE-grown cells were incubated with MTBE, MTBE degradation was accompanied by a near stoichiometric accumulation of TBA (FIG. 2). TBA degradation occurred after a lag period of about 5 hr. If cells were grown on MTBE or TBA, however, there was no accumulation of TBA during subsequent MTBE degradation assays, and no lag period before TBA degradation. The initial TBA degradation rates at 30° C. with TBA-grown cells and 25 mg/L TBA was 30 nmoles TBA/min./mg cell protein. Strain ENV735 did not degrade TBA in the absence of oxygen. HIBA and formaldehyde were the only water soluble degradation intermediates detected in this study.

Example 2

Protein Labeling

To label potential MTBE-degrading proteins YE-grown ENV735 was harvested by centrifugation and resuspended in BSM to an OD550 of 1. Subsamples (10 ml) of the cell suspension were placed in 3 separate 50-ml serum vials. Chloramphenicol was added to two of the vials to a final concentration of 200 mg/ml. Then, 5–10 $\mu$Ci of uniformly labeled [$^{14}$C] MTBE (10.07 mCi/mmol) was then added to each vial, and the vials were incubated for 3 h on an orbital shaker (100 rpm) at room temperature. After incubation the vials were centrifuged to pellet the cells, and the cells were resuspended in 1 ml of SDS-PAGE sample buffer and boiled to lyse cells and denature proteins. Subsamples (10–40 ml) of the lysates were loaded onto an 8% polyacrylamide gel and separated by electrophoresis. The gels were stained with coomassie blue, dried under vacuum, and placed against a phosphor imaging screen for up to 4 weeks to generate phosphor images of the labeled proteins. The phosphor image was analyzed on a phosphor imaging system using the manufacturer's instructions and methods familiar to those skilled in the art.

Results of the study revealed that in the presence of cyclohexamide (a protein synthesis inhibitor) a single protein of approximately 41 kD became radiolabeled. Conversely, in the absence of cyclohexamide many proteins became labeled. These results indicate that MTBE is metabolized by strain ENV735 and that the carbon from MTBE is incorporated into many proteins synthesized by the cells (samples with no cycloheximide). Furthermore, the observation that only one protein becomes labeled in the presence of cycloheximide suggest that a protein of approximately 41 kD in size is involved in MTBE degradation, and that the protein involved is likely the MTBE oxygenase. The oxygenase could be labeled by the entire [$^{14}$C] MTBE molecule binding to the active site of the enzyme, or the $^{14}$C-formaldehyde released during [$^{14}$C]MTBE oxidation could covalently bind to the oxygenase enzyme.

Example 3

Induction of tert-butyl Alcohol Degradation

To evaluate induction of TBA degradation, cells were grown on either LB broth or BSM with YE (0.01%) and MTBE or TBA. Total cellular proteins were analyzed by using SDS-PAGE analysis on a 8% polyacrylamide gel by techniques familiar to those skilled in the art. When cells were grown with MTBE or TBA they produced peptides of approximately 60, 40, and 22 kDa that were not produced in abundance in YE-grown cells. Furthermore, TBA was degraded by MTBE-grown or TBA-grown cells without a lag period. These results suggest that TBA degradation genes, and TBA degradation activity, in strain ENV735 is induced by TBA.

Example 4

Degradation of MTBE by Other Hydrogen-oxidizing Bacteria

To evaluate MTBE degradation by other hydrogen oxidizing bacteria, a $H_2$ enrichment was performed with turf soil and sewage sludge to grow indigenous $H_2$oxidizers, and two known hydrogen oxidizers were obtained from the ATCC. The strains were grown on BSM media with hydrogen as an energy source or on BSM and YE as described above, and then incubated with MTBE. TBA was produced by MTBE degradation in cultures of *H. flava* (ATCC 33667) and *H. palleronii* (ATCC 17724) after growth in 0.3% YE in BSM. For example, in one experiment with *H. flava* ($OD_{550}$=1.1; 25 mg/L MTBE initial concentration), 0.9 mg/L of TBA and 23.4 mg/L of MTBE was present after 24 hr. of incubation at 30° C. A similarly incubated culture of H. palleronii (OD550=1.3) contained 0.25 mg/L TBA and 22 mg/L MTBE after 48 hr of incubation at 30° C. In each case, there was no change in the MTBE concentration and no TBA production in poisoned samples. These results demonstrated that hydrogen-oxidizing bacteria other than ENV735 can degrade MTBE.

Example 5

Aquifer Microcosms

Aquifer microcosms were prepared using saturated aquifer soils and groundwater from an MTBE-contaminated fuel terminal site located in northern California. Each microcosm contained 15 g of soil and 30 mL of groundwater (22 mg/L MTBE; pH 6.7) in 160 mL serum vials sealed with Teflon-lined septa. Triplicate microcosms received either $1\times10^7$, $1\times10^8$, or $1\times10^9$, cells/mL of TBA-grown ENV 735. Control microcosms received no ENV 735. Microcosms were incubated at 20° C. with shaking.

Results of microcosm studies with ENV735 are shown in FIG. 3. MTBE concentrations in the microcosms seeded with $10^9$ or $10^8$ ENV 735/mL were reduced to below the limit of detection (50 $\mu$g/L) within the first 100 hours of incubation, and they were below detection limits in microcosms inoculated with $10^7$ cells/mL after 6 days of incubation.

Example 6

Bioreactor Systems

MTBE degradation by ENV 735 was tested in two membrane bioreactor (MBR) systems made from 85-L PCV tanks (16 inch diameter) and internal microporous hollow fiber membranes (ZeeWeed™ ZW10;Zenon, Inc.). The first reactor (MBR1) was seeded with ENV 735, and it has a feed stream of MTBE in 0.4×BSM. The second reactor (MBR2) was inoculated with a culture from MBR1, and was fed MTBE in tap water with $NH_4Cl$ and $H_3PO_4$ as nutrients.

Flow into the reactors was controlled to achieve a hydraulic retention time (HRT) of one to 3 days, and the influent MTBE concentration was maintained at between 1000 and 2000 mg/L. The pH of the reactors was controlled by adding 5 N NaOH. A calculated solids retention time (SRT) of 160 days was maintained by removing a portion of the reactor contents each day. The dissolved oxygen concentration in the reactor was maintained at ~2 mg/L by adding air. MTBE stripping was evaluated by analyzing samples of the effluent air, and it was always <5% of the MTBE loss.

A laboratory-scale FBR was constructed from a glass column with Teflon and stainless steel tubing and fittings to minimize abiotic losses. The system had a total liquid volume of 4.5 L. Granulated activated carbon (settled bed volume ~800 mL) was used as a support medium. The carbon was fluidized to an expanded bed height of 125% of the original bed height by using a gear pump in the recycle line. Contaminated water was fed at a rate of 5.6 to 17 mL/min using a peristaltic pump, corresponding to hydraulic retention times (HRTs) of approximately 3 to 1 h, respectively. The HRT was calculated based on expanded bed volume and feed flow rate (assumes no significant biodegradation occurred in other wetted areas of the reactor).

Results of membrane bioreactor studies are shown in FIG. 4 (MBR1) and FIG. 5 (MBR2). MTBE influent concentrations were either ~1000 mg/L (MBR1) or ~2000 mg/L (MBR2) in the two MBR reactors, and initial hydraulic retention times were maintained at ~3 days (1.2 L/hr into the 85L reactors). After successful operation, the HRTs were reduced to 1 day. MTBE removal rates in MBR1 reached 42 mg/L/hr during operation with a 1 d HRT. MTBE removal in MBR2 reached 28 mg/L/hr while BTEX removal was 0.4 mg/L/hr BTEX (>99%) during the same time. After an initial evaluation period during which solids retention times (SRT) were infinite (i.e., no solids removal) the SRTs were maintained at 160 days (calculated value) with MTBE as the only carbon source. Biomass in MBR1 increased from 5000 mg/L on day 1 to ~12,000 mg/L on day 125. The feed to biomass ratio in the reactor was approximately 0.03 mg MTBE/h/mg biomass. Plate count analysis of MBR1 performed after 2 months of operation revealed that ENV 735 comprised >70% of the reactor microbial population. Both MBRs recovered well from spikes in the influent MTBE concentration, and from periods of no feed caused by feed pump malfunctions.

A fluid bed bioreactor inoculated with the ENV 735-containing culture from MBR1 degraded 10 mg/l MTBE to <100 μg/L at a hydraulic retention time of 3 h (FIG. 6). This represented a removal efficiency of ~99%. When the flow rate into the reactor was increased 3-fold (1 hr HRT), the reactor continued to remove >90% of the added MTBE.

What is claimed is:

1. A process for degrading an ether by contacting said ether with a hydrogen oxidizing bacterium, wherein said hydrogen oxidizing bacterium is not Rubrivivax (Sphingomonas) strain PM1.

2. A process for degrading a tertiary alcohol by contacting said tertiary alcohol with a hydrogen-oxidizing bacterium, wherein said hydrogen oxidizing bacterium is not Rubrivivax (Sphingomonas) strain PM1.

3. The process of claim 1 in which said ethers are selected from the group consisting of: methyl tertiary-butyl ether, ethyl tertiary-butyl ether, tertiary amyl methyl ether, propyl isopropyl ether, and diisopropyl ether.

4. The process of claim 2 in which said tertiary alcohol is tertiary-butyl alcohol.

5. The process of claim 1 in which said ethers are present in a contaminated medium selected from the group consisting of: groundwater, soil, wastewater, or process water.

6. The process of claim 1 in which said ether degradation occurs in situ.

7. The process of claim 2 in which said tertiary alcohol degradation occurs in situ.

8. The process of claim 1 in which said ether degradation occurs in a bioreactor.

9. The process of claim 2 in which said tertiary alcohol degradation occurs in a bioreactor.

10. The process of claim 1 in which said hydrogen oxidizing bacterium is isolated by enrichment culturing with hydrogen as an electron donor.

11. The process of claim 2 in which said hydrogen oxidizing bacterium is isolated by enrichment culturing with hydrogen as an electron donor.

12. The process of claim 1 in which said hydrogen oxidizing bacterium is isolated by enrichment culturing with MTBE as an electron donor.

13. The process of claim 2 in which said hydrogen oxidizing bacterium is isolated by enrichment culturing with MTBE as an electron donor.

14. The process of claim 1 in which said hydrogen oxidizing bacterium is a member of the genus Hydrogenophaga.

15. The process of claim 2 in which said hydrogen oxidizing bacterium is a member of the genus Hydrogenophaga.

16. The process of claim 1 in which said hydrogen oxidizing bacterium is *Hydrogenophaga flava* strain ENV735.

17. The process of claim 2 in which said hydrogen oxidizing bacterium is *Hydrogenophaga flava* strain ENV735.

18. The process of claim 6 in which hydrogen is added to, or produced in, the subsurface in either the saturated or unsaturated zones of the soil or rock.

19. The process of claim 18 in which hydrogen is produced in situ by passing an electrical current between at least two electrodes.

20. The process of claim 6 in which a hydrogen oxidizing bacterium is added to the contaminated media.

21. The process of claim 20 in which said hydrogen oxidizing bacterium is *Hydrogenophaga flava* strain ENV735.

22. The process of claim 8 in which hydrogen-oxidizing bacteria are added to said bioreactor.

23. The process of claim 22 in which said hydrogen oxidizing bacteria includes *Hydrogenophaga flava* strain ENV735.

24. A hydrogen-oxidizing bacterium of the genus Hydrogenophaga capable of degrading an ether selected from the group consisting of: methyl tertiary-butyl ether, ethyl tertiary-butyl ether, tertiary amyl methyl ether, propyl isopropyl ether, and diisopropyl ether.

25. The bacterium of claim 24 wherein said bacterium is of the species *Hydrogenophaga flava*.

26. The bacterium of claim 24 wherein said bacterium is *Hydrogenophaga flava* strain ENV735.

27. The bacterium of claim 24 wherein said ether is methyl tertiary-butyl ether.

28. The method of claim 3 wherein said ether is methyl tertiary-butyl ether.

29. A hydrogen-oxidizing bacterium of the genus Hydrogenophaga capable of degrading a tertiary alcohol.

30. The bacterium of claim 29 wherein said bacterium is of the species *Hydrogenophaga flava*.

31. The bacterium of claim 29 wherein said bacterium is *Hydrogenophaga flava* strain ENV735.

32. The bacterium of claim 29 wherein the tertiary alcohol is tertiary-butyl alcohol.

33. A process for in situ degradation of methyl tertiary-butyl ether at a site containing methyl tertiary-butyl ether comprising adding hydrogen to the subsurface at said site.

34. A process for in situ biological degradation of methyl tertiary-butyl ether at a site containing methyl tertiary-butyl ether comprising production of hydrogen in the subsurface at said site by passing an electrical current between at least two electrodes.

35. A process for degrading an ether by contacting said ether with a hydrogen oxidizing bacterium, wherein said hydrogen oxidizing bacterium is a member of the genus Hydrogenophaga.

36. A process for degrading a tertiary alcohol by contacting said tertiary alcohol with a hydrogen-oxidizing bacterium, wherein said hydrogen oxidizing bacterium is a member of the genus Hydrogenophaga.

* * * * *